Figure 1:
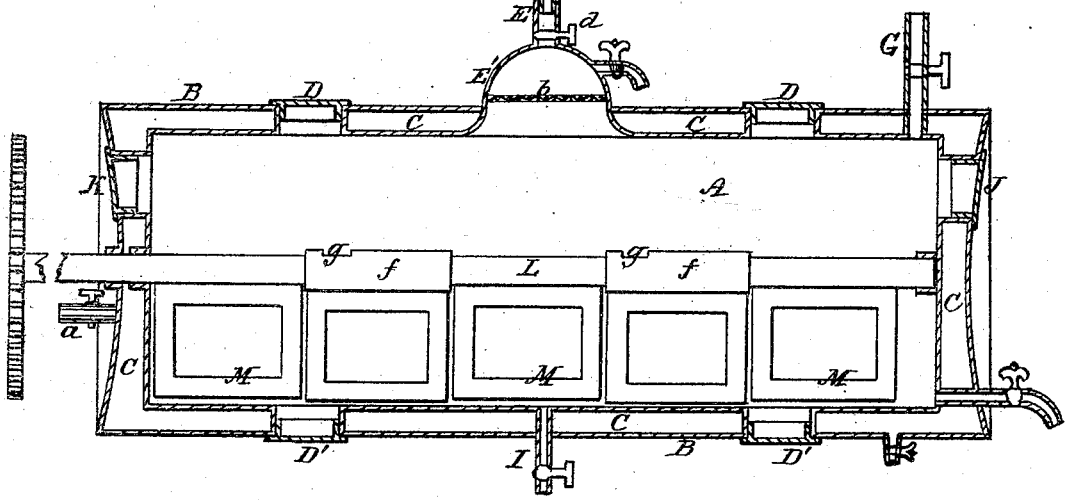

J. J. CRAVEN.
Improvement in Rendering and Drying Apparatus in the Treatment of Animal-Matter.

No. 131,429. Patented Sep. 17, 1872.

Witnesses:
J. West Wagner
Augustus H. Girard

Inventor:
John J. Craven
By Johnson Klaucke & Co.
his Attorneys

J. J. CRAVEN.
Improvement in Rendering and Drying Apparatus in the Treatment of Animal-Matter.

No. 131,429. Patented Sep. 17, 1872.

Witnesses:
J. West Magnus
Augustus H. Girard

Inventor:
John J. Craven
By Johnson Hauck &co
his Attorneys

UNITED STATES PATENT OFFICE.

JOHN J. CRAVEN, OF BERGEN DISTRICT, JERSEY CITY, NEW JERSEY.

IMPROVEMENT IN RENDERING AND DRYING APPARATUS IN THE TREATMENT OF ANIMAL MATTER.

Specification forming part of Letters Patent No. 131,429, dated September 17, 1872.

*To all whom it may concern:*

Be it known that I, JOHN J. CRAVEN, of Bergen district, Jersey City, in the county of Hudson and State of New Jersey, have invented certain new and useful Improvements in Rendering and Drying Apparatus in the Treatment of Animal Matter, of which the following is a specification:

My invention relates to apparatus for rendering animal matter and drying the residuum; and the invention, which forms the subject-matter of this patent, consists: First, in the employment, in combination with an apparatus for rendering animal matter, of a receiving-tank or reservoir located and arranged above the rendering-vessel and communicating therewith by means of a tube or column, whereby the entire displacement of the oils from the rendering-vessel is effected by the force of an inflowing stream of water within the vessel, the said reservoir serving also to hold the settlings from the oil and return them by direct gravitation to the rendering-vessel, to be again treated with the next charge. Second, in the employment, in an apparatus for rendering animal matter, of a glass tube or column, located and arranged between said generating-vessel and an outer upper receiving and settling tank, by which the advantage of fine lines of separation between the outward flow of oil and the inward flow of water can be observed and controlled. Third, in the arrangement, within the dome or chamber of the discharging column of the rendering-vessel, of a perforated diaphragm or filter, the object of which is to prevent the escape of any floating material from the rendering-vessel without interrupting the free escape of the oils. Fourth, in the employment, in a combined rendering and drying apparatus for animal matter, of a series of agitators arranged upon a shaft in a manner to have a movement thereon independent of the motion thereof, in order that when the shaft is at rest while charging the vessel or rendering the material the agitators will automatically assume pendent positions from the shaft, and thus leave the entire area of the vessel unobstructed for the free reception of the raw material in fragment or carcass; but, upon using the machine as a drier and giving motion to the shaft, the several agitators will assume their proper radial positions and functions as such; and, finally, in a combined rendering and drying apparatus for animal matter, having its several parts constructed and arranged for joint operation, as will be more fully hereinafter described.

Figure 2:
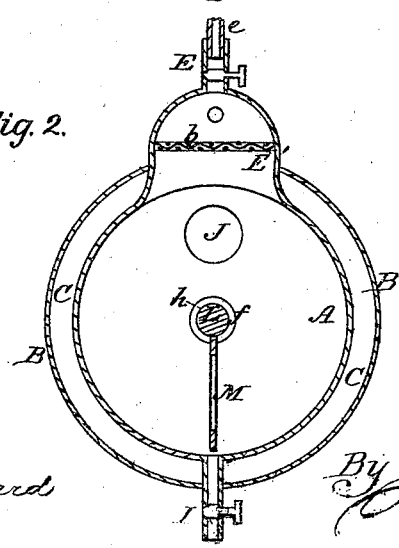
Figure 3:
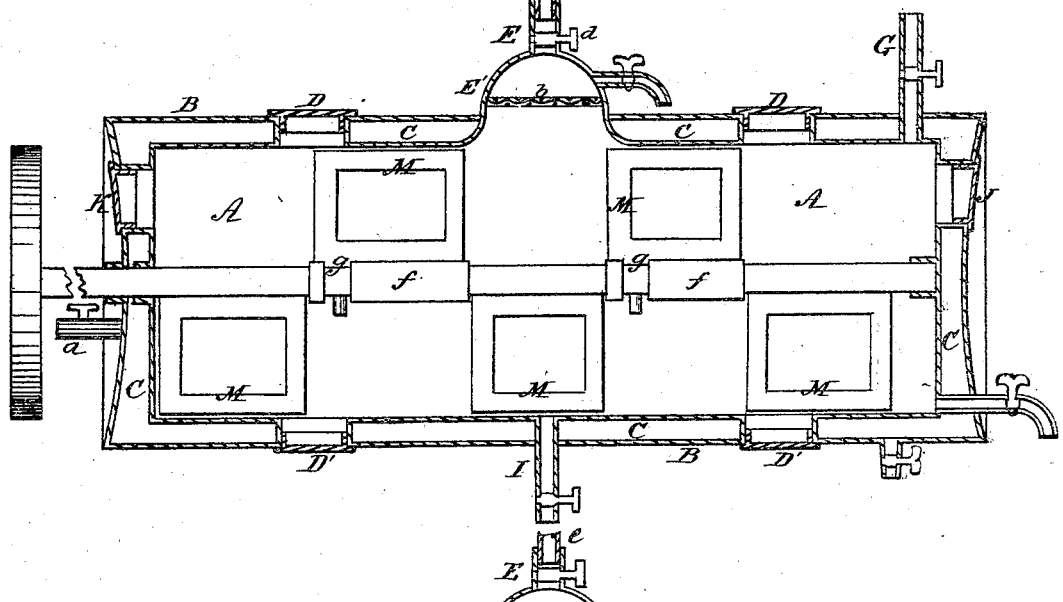
Figure 4:
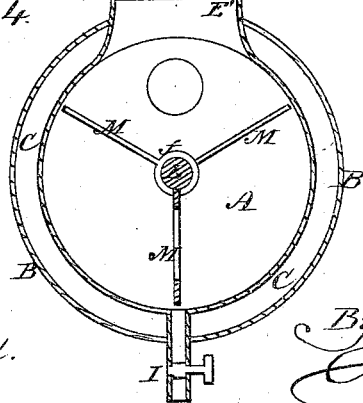

In the accompanying drawing, Figure 1 represents a vertical longitudinal section of my improved apparatus adapted for rendering animal matter. Fig. 2 represents a cross-section thereof. Fig. 3 represents a similar section of the apparatus adapted for drying animal matter after the oil and water have been expelled therefrom; and Fig. 4 represents a transverse section of the same.

The apparatus consists of an inner receiving-cylinder, A, for the matter, and an inclosing jacket, B, forming an intervening steam-heating chamber, C, communicating with the boiler by a tube, a, arranged in the end or at any convenient part of the outer vessel. This jacketed cylinder B is provided with a number of man-holes in the upper and lower sides thereof—the upper ones, D, for the introduction of the animal matter to the rendering-vessel, and the lower ones, D', for the removal of the dried matter, bones, &c. In this vessel two separate and distinct processes are produced—viz., the rendering of the raw material and the expulsion of the fatty matter at the top, and the drying of the residuum or solid matter and its removal through the bottom man-holes of said vessel—thereby producing and perfecting two operations, hitherto performed separately and in separate vessels, in one and the same apparatus, and accomplishing thereby a very great saving in cost of machinery, time, fuel, and labor in carrying out the continuous operation. As a rendering apparatus, no continuous stirring or agitation is required of the matter, which is introduced in portions or carcass through the upper man-holes. A tube or pipe, E, communicates with the inner cylinder A, rises therefrom through the outer jacket B, and connects above the vessel with a tank or reservoir, F, into which the oil is expelled, after the operation of rendering is completed, in a manner to be presently described.

The inner cylinder A being charged, it is partially filled with water. Steam is then admitted therein and to the surrounding chamber C through suitable tubes to effect the boiling of the matter, as shown in the drawing. The matter is boiled a sufficient time to insure a thorough separation of the fatty matters, when the steam is cut off from the inner and outer chambers. Cold water is then forced into the inner chamber C through the pipe G from the top until the vessel is filled. This accomplishes two purposes—viz., the condensation of the steam and thereby the removal of the pressure within the vessel, and the elevation of the oil to the top thereof; and its expulsion therefrom through the vertical column E into the settling-tank F above by the direct pressure of the downward inflowing column of water within the vessel, and in this way the introduction of the water gradually and finally displaces the oil or fatty matter from the inner vessel. In order to determine when the oil is expelled from the cylinder, the vertical column E is provided with a glass section, $e$, to render distinct the fine line of division; and as that line approaches the top of the indicating-tube E, rendering certain the effectual displacement of the fatty matters, the attendant cuts off the water-supply to the cylinder by closing the water-cock H of the vessel. During this operation the oil is forced into and retained in the upper tank F. To prevent the hair or other clogging matter which will float upon the surface from passing up the column E, I arrange in the enlarged base thereof a perforated diaphragm, $b$, which may be made removable, if desired, for facility in cleaning. Cocks $c$ and $d$ are inserted in the column E, both above and below the glass indicating-tube $e$, to draw off the oil from the column, and cut off the communication of the vessel with the outlet column during the process of drying. The water in the rendering-vessel is then drawn off through the cock I; the covers in the apertures J K in the ends of the cylinder are then removed, and dry heated air introduced under pressure at one end; and the moistened air in the vessel expelled through the opening K in the other end by the same force, whence it is carried, if necessary, to the furnace to be consumed. At this stage steam is again let into the surrounding-chamber C, and the apparatus is changed from a rendering-tank to a drier of animal matter, the only addition necessary to the accomplishment of which is giving motion to the agitating-shaft L, which is mounted in suitable bearings within the vessel and extends beyond one end, to which the driving power is applied. The shaft L is provided with agitators M, arranged thereon so as to have a movement or partial revolution independent of the shaft, when a turn is made in a direction opposite to their regular motion; the object being to fold the agitators beneath the shaft L to obtain the full area of the inner vessel A for the reception of the raw material, and thereby admit larger masses and free distribution of the same throughout the entire cylinder. The independent turning of the agitators M, to fold out of the way, is effected by mounting them on sleeves $f$, one end, $g$, of which fits into a recess, $h$, on the shaft L, and thus forms stops to hold the agitators open when in operation, but allowing them to automatically turn and hang down from the shaft by simply reversing its motion. The agitators are designed to stir the matter as it is being dried, and the abrasive action of the mass upon the walls of the cylinder is sufficient to keep them always free from adhering matter. When the matter is sufficiently dried it is removed through the lower man-holes D', which are then closed. In the meantime the oil from the settling-tank has been drawn off, leaving the settlings in the bottom and in the column, which are now let into the rendering-vessel by opening the stop-cocks in the column and rendered over with the next charge in the cylinder. In this way the coarser portion of the fatty matter expelled by the force of the water is fed back again by its gravity into the cylinder A from the settling-tank, and so on at each alternate expulsion of the oil and charging of the vessel.

It will be observed that the enlarged area of the base of the column facilitates the free flow of the oil into the column from the rendering-vessel, and the diaphragm can be easily reached from the upper man-hole for cleaning it of hair, &c., from the rendered matter. It will also be observed that the oil can be forced out at the base of the column above the diaphragm, in case anything should contra-indicate the use of the upper tank or receiver.

Having described my invention, I claim—

1. In combination with a combined rendering and drying apparatus for animal matter, the column E and receiving-tank F, through and into which the oil is forced by the pressure of the inflowing water within the vessel, and the sediment of the oil in the tank returned to the vessel by gravitation, essentially as described.

2. The arrangement, in the vertical column E, of the indicating glass section $e$, located between the vessel A and the receiving-tank F, whereby to determine when the oil has been expelled, and to prevent the water from also passing out into the tank with the oil, by bringing to view the line of separation, substantially as described.

3. In combination with the receiving-tank F and conducting-column E, the perforated diaphragm $b$, arranged within the vessel A at the base of the said column, to prevent the ascent of hair, &c., with the oil from the renderer.

4. In a combined rendering and drying apparatus for the treatment of animal matter, the hinged or pivoted agitators, capable of independent motion upon the shaft which carries them, to fold or hang pendent therefrom essentially as and for the purposes herein set forth.

5. In a combined rendering and drying apparatus, having a revolving shaft, of agitators, the said agitators connected therewith in a manner to allow them to perform their functions when turned in one direction, and to automatically assume pendent positions when the shaft is partially turned in the opposite direction, as described.

6. A combined rendering and drying apparatus for the treatment of animal matter, having all its parts constructed and arranged for operation under two separate and distinct processes, substantially as described.

JOHN J. CRAVEN.

Witnesses:
A. E. H. JOHNSON,
J. W. HAMILTON JOHNSON.